(12) United States Patent
Cheru et al.

(10) Patent No.: US 10,133,764 B2
(45) Date of Patent: Nov. 20, 2018

(54) REDUCTION OF WRITE AMPLIFICATION IN OBJECT STORE

(71) Applicant: SanDisk Technologies Inc., Plano, TX (US)

(72) Inventors: Tomy Ammuthan Cheru, Kerala (IN); Brian W. O'Krafka, Austin, TX (US); Allen Samuels, San Jose, CA (US); Manavalan Krishnan, Fremont, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 233 days.

(21) Appl. No.: 15/144,704

(22) Filed: May 2, 2016

(65) Prior Publication Data

US 2017/0091243 A1    Mar. 30, 2017

Related U.S. Application Data

(60) Provisional application No. 62/234,895, filed on Sep. 30, 2015.

(51) Int. Cl.
*G06F 17/30* (2006.01)
*G06F 3/06* (2006.01)
(Continued)

(52) U.S. Cl.
CPC ...... *G06F 17/30327* (2013.01); *G06F 3/0604* (2013.01); *G06F 3/0655* (2013.01);
(Continued)

(58) Field of Classification Search
CPC ......... G06F 17/30463; G06F 17/30471; G06F 3/0604; G06F 17/30289; G06F 17/30327; G06F 17/30961
(Continued)

(56) References Cited

U.S. PATENT DOCUMENTS 7,710,777 B1    5/2010  Montierth et al.
7,996,642 B1    8/2011  Smith
(Continued)

FOREIGN PATENT DOCUMENTS

WO    WO 2015/047398    4/2015
WO    WO 2015/152830    10/2015

OTHER PUBLICATIONS

International Search Report and Written Opinion dated Jun. 30, 2015, received in International Patent Application No. PCT/US2015/023927, which corresponds to U.S. Appl. No. 14/454,687, 11 pages (Kadayam).

(Continued)

*Primary Examiner* — Shahid Alam
(74) *Attorney, Agent, or Firm* — Morgan, Lewis & Bockius LLP

(57) ABSTRACT

A method of managing a storage system having one or more storage devices includes receiving a request to access, in a tiered data structure, a data object and one or more attributes of the data object and processing the access request. The request includes a first key value for the data object and respective second key values for the one or more attributes of the data object. Modified key values for the attributes of the data object are generated in accordance with at least a portion of the first key value and used to access tree entries for the data object attributes in one or more leaf nodes of the tiered data structure. A tree entry for the data object is also accessed from the same set of one or more leaf nodes.

20 Claims, 9 Drawing Sheets

(51) Int. Cl.
*G06F 13/28* (2006.01)
*G06F 12/02* (2006.01)

(52) U.S. Cl.
CPC ........ *G06F 3/0679* (2013.01); *G06F 12/0246* (2013.01); *G06F 13/28* (2013.01); *G06F 17/30289* (2013.01); *G06F 17/30958* (2013.01); *G06F 17/30961* (2013.01); *G06F 2212/1036* (2013.01); *G06F 2212/1044* (2013.01)

(58) Field of Classification Search
USPC ........................................................ 707/744
See application file for complete search history.

(56) References Cited

U.S. PATENT DOCUMENTS

| | | |
|---|---|---|
| 9,158,681 B1 | 10/2015 | Samuels et al. |
| 9,170,938 B1 | 10/2015 | Walsh et al. |
| 2003/0229627 A1 | 12/2003 | Carlson et al. |
| 2004/0167898 A1 | 8/2004 | Margolus et al. |
| 2006/0159109 A1 | 7/2006 | Lamkin et al. |
| 2007/0156842 A1 | 7/2007 | Vermeulen et al. |
| 2007/0174309 A1 | 7/2007 | Pettovello |
| 2007/0185902 A1 | 8/2007 | Messinger et al. |
| 2009/0012976 A1 | 1/2009 | Kang et al. |
| 2009/0119450 A1 | 5/2009 | Saeki et al. |
| 2011/0145512 A1 | 6/2011 | Adl-Tabatabai et al. |
| 2011/0252067 A1 | 10/2011 | Marathe et al. |
| 2012/0005419 A1 | 1/2012 | Wu et al. |
| 2012/0117328 A1 | 5/2012 | McKean et al. |
| 2012/0166360 A1 | 6/2012 | Shah et al. |
| 2012/0179645 A1 | 7/2012 | Lomet et al. |
| 2012/0259863 A1 | 10/2012 | Bodwin et al. |
| 2014/0075100 A1 | 3/2014 | Kaneko et al. |
| 2014/0185376 A1 | 7/2014 | Sinclair et al. |
| 2014/0189211 A1 | 7/2014 | George et al. |
| 2015/0212752 A1 | 7/2015 | Nemazie et al. |
| 2015/0242307 A1 | 8/2015 | Busaba et al. |
| 2015/0253999 A1 | 9/2015 | Nemazie et al. |
| 2015/0277794 A1 | 10/2015 | Tudor et al. |
| 2015/0278093 A1 | 10/2015 | O'Krafka et al. |
| 2015/0281389 A1 | 10/2015 | Firsov et al. |
| 2015/0370492 A1 | 12/2015 | Satnur et al. |
| 2015/0370701 A1 | 12/2015 | Higgins et al. |
| 2015/0378884 A1 | 12/2015 | Nemazie et al. |
| 2016/0034507 A1 | 2/2016 | Aron et al. |
| 2016/0085464 A1 | 3/2016 | Tuers et al. |
| 2016/0132265 A1 | 5/2016 | Yi et al. |
| 2016/0299715 A1 | 10/2016 | Hashimoto et al. |
| 2016/0321010 A1 | 11/2016 | Hashimoto |
| 2016/0321294 A1 | 11/2016 | Wang et al. |
| 2016/0335299 A1 | 11/2016 | Vemulapati et al. |
| 2017/0075781 A1 | 3/2017 | Bennett, Jr. et al. |
| 2017/0242785 A1 | 8/2017 | O'Krafka et al. |

OTHER PUBLICATIONS

International Search Report and Written Opinion dated Sep. 14, 2016, received in International Patent Application No. PCT/US2016/036720, which corresponds to U.S. Appl. No. 15/144,704, 12 pages (Cheru).

Wilson's : "Working Draft SCSI Extended Copy Command," Apr. 2, 1999, http://www.t10.org/ftp/t10/document.99/99-143r1.pdf, 34 pages.

International Search Report and Written Opinion dated Nov. 7, 2016, received in International Patent Application No. PCT/US2016/051717, which corresponds to U.S. Appl. No. 14/929,171, 13 pages ( Shelton).

International Search Report and Written Opinion dated Mar. 15, 2017, received in International Patent Application No. PCT/US2016/067728, which corresponds to U.S. Appl. No. 15/208,540, 14 pages (O'Krafka).

500

Manage a storage system having one or more storage devices, including: — 502

> The managing is performed by a host system separate from the storage system, and at least the non-leaf nodes are stored (e.g., a cache copy is stored) in volatile memory of the host system — 504

Receive a request to access, in a tiered data structure, a data object and one or more attributes of the data object, wherein the tiered data structure is stored in the storage system, the request including a first key value corresponding to the data object and one or more respective second key values corresponding to each of the one or more attributes of the data object — 506

> The request to access comprises a read command to read, from the tiered data structure, the data object and the one or more attributes of the data object — 508
>
>> The data object, as stored in the storage system, comprises encoded data — 510
>
>> The managing includes decoding the data object, read from the tiered data structure, and providing the decoded data object to a requester — 512

> The request to access comprises a write command to write, to the tiered data structure, the data object and the one or more attributes of the data object — 514

> The tiered data structure comprises a tree of nodes, including non-leaf nodes, leaf nodes, and data nodes, wherein at least the leaf nodes and data nodes are stored in non-volatile memory of the storage system — 516

↓

Process the access request
(A) — 518

Figure 5A

REDUCTION OF WRITE AMPLIFICATION IN OBJECT STORE

RELATED APPLICATIONS

This application claims priority to U.S. Provisional Patent Application No. 62/234,895, filed Sep. 30, 2015, which is incorporated by reference in its entirety.

TECHNICAL FIELD

The disclosed embodiments relate generally to memory systems, and in particular, to systems for storing key/value pairs in a non-volatile storage device.

BACKGROUND

Semiconductor memory devices, including flash memory, typically utilize memory cells to store data as an electrical value, such as an electrical charge or voltage. A flash memory cell, for example, includes a transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Non-volatile memory systems are often used to store a database of information, such as a database in which data objects and their attributes are stored. The database is typically organized and stored as a tiered data structure, for example a tree data structure (e.g., a B-tree) having nodes in which data objects, pointers to the data objects, and attributes (sometimes called metadata) are stored. When writing an object and N attributes of the object to the tiered data structure, for example in response to a host computer command, typically N+2 nodes of the data structure (assuming the data object can be written in its entirety into a single node) would need to be updated, and thus rewritten, whereas the total amount of data to be written would typically be less than the total capacity of two (2) nodes. As a result, there is "write amplification" that is on the order of (N+2)/X, where X is the total amount of data to be written in units of nodes.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used to reduce write-amplification in an object store. In some embodiments, a method of managing a storage system having one or more storage devices includes processing a request to access (e.g., read or write) a data object by generating one or more modified keys for one or more attributes of the data object, accessing a plurality of tree entries in one or more leaf nodes of a tiered data structure (e.g., stored in the one or more storage devices), and accessing the data object in a data node of the tiered data structure.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

FIGS. 5A-5C illustrate a flowchart representation of a method of managing a storage system, in accordance with some embodiments.

Figure 1:
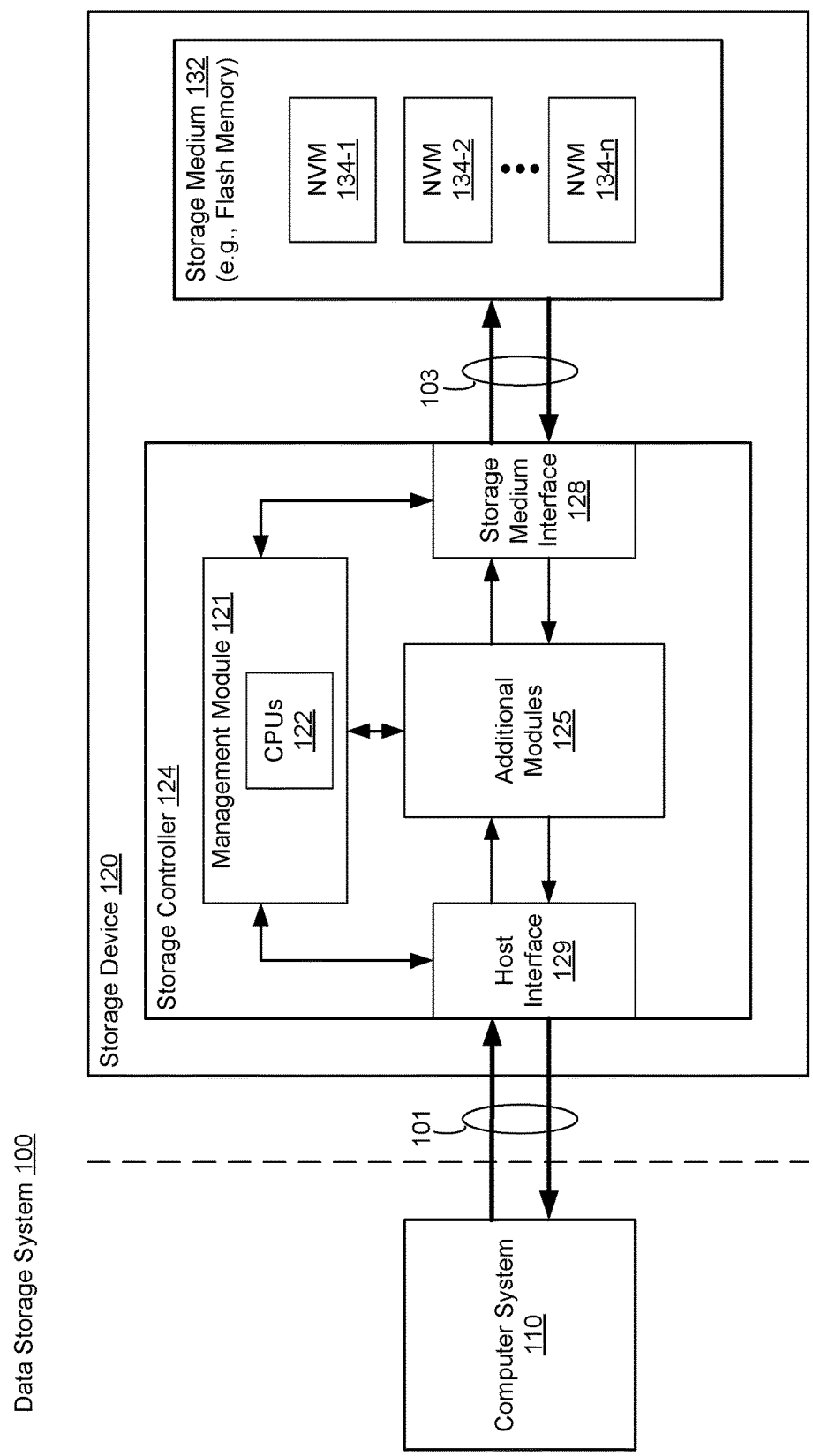
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Non-volatile memory systems are often used to store a database of information, such as a database in which data objects and their attributes are stored. The database is typically organized and stored as a tiered data structure, for example a tree data structure (e.g., a B-tree) having nodes in which data objects, pointers to the data objects, and attributes (sometimes called metadata) are stored. As described in more detail below, storing a data object and its associated attributes to the tiered data structure can result in significant write amplification, which in turn may decrease the useful life of the storage devices in which the database is stored. The various implementations described herein include systems, methods, and/or devices used to reduce write-amplification in an object store in which data objects and associated attributes are stored.

(A1) More specifically, in some embodiments, a method of managing a storage system having one or more storage devices includes receiving a request to access, in a tiered data structure, a data object and one or more attributes of the data object and processing the access request. The tiered data structure is stored in the storage system, and the request includes a first key value corresponding to the data object and one or more respective second key values corresponding to each of the one or more attributes of the data object. Processing the access request includes generating one or more modified key values for the one or more attributes of the data object in accordance with at least a portion of the first key value, accessing a plurality of tree entries in one or more leaf nodes of the tiered data structure, and accessing the data object in a data node of the tiered data structure. Further, the plurality of accessed tree entries include a data object entry that includes the first key value and a reference to the data object and one or more attribute entries, each attribute entry including a respective attribute of the one or more attributes of the data object and the modified key value corresponding to the respective attribute.

(A2) In some embodiments of the method of A1, generating the one or more modified key values for the one or more attributes includes prepending at least a portion of the first key value to each of the one or more respective second key values.

(A3) In some embodiments of the method of A1 or A2, in accordance with the first key value and the one or more modified key values, the data object entry and one or more attribute entries comprise a contiguous set of tree entries in the tiered data structure.

(A4) In some embodiments of the method of A3, the contiguous set of tree entries are stored in a single leaf node of the tiered data structure, and said accessing comprises only two I/O operations, including a first I/O operation to access the single leaf node from non-volatile memory of the storage system and a second I/O operation to access the data node from said non-volatile memory of the storage system.

(A5) In some embodiments of the method of any of A1-A4, the request to access comprises a read command to read, from the tiered data structure, the data object and the one or more attributes of the data object.

(A6)) In some embodiments of the method of A5, the data object, as stored in the storage system, comprises encoded data; and the method includes decoding the data object, read from the tiered data structure, and providing the decoded data object to a requester.

(A7) In some embodiments of the method of any of A1-A4, the request to access comprises a write command to write, to the tiered data structure, the data object and the one or more attributes of the data object.

(A8) In some embodiments of the method of A7, said accessing operations comprises two I/O operations, including a first I/O operation to write, to the non-volatile memory of the storage system, a single leaf node that includes the data object entry and the one or more attribute entries, and a second I/O operation to write, to the non-volatile memory of the storage system, the data node.

(A9) In some embodiments of the method of any of A1-A8, the tiered data structure comprises a tree of nodes, including non-leaf nodes, leaf nodes, and data nodes, and at least the leaf nodes and data nodes are stored in non-volatile memory of the storage system.

(A10) In some embodiments of the method of A10, the method is performed by a host system separate from the storage system, and at least the non-leaf nodes are stored in volatile memory of the host system.

(A11) In another aspect, a host system comprises an interface for operatively coupling to a storage system having one or more storage devices, one or more hardware processors, and memory storing one or more programs. The one or more programs, when executed by the one or more processors, cause the host system to perform operations including receiving a request to access, in a tiered data structure that is stored in the storage system, a data object and one or more attributes of the data object, the request including a first key value corresponding to the data object and one or more respective second key values corresponding to each of the one or more attributes of the data object. The operations performed, due to execution of the one or more programs by the one or more processors, further include generating one or more modified key values for the one or more attributes of the data object in accordance with at least a portion of the first key value; and accessing, in the tiered data structure, a data node storing the data object and a plurality of tree entries in one or more leaf nodes, the plurality of tree entries comprising a data object entry that includes the first key value and a reference to the data object and one or more attribute entries, each attribute entry including a respective attribute of the one or more attributes of the data object and the modified key value corresponding to the respective attribute.

(A12) In some embodiments of the host system of A11, the host system is further configured to operation in accordance with the method of any of A2 to A10.

(A13) In another aspect, a storage system comprises an interface for operatively coupling to a storage system having one or more storage devices, one or more hardware processors, and controller memory storing one or more programs. The one or more programs, when executed by the one or more processors, cause the storage system to perform operations including receiving a request from the host system to access, in a tiered data structure that is stored in the storage system, a data object and one or more attributes of the data object, the request including a first key value corresponding to the data object and one or more respective second key values corresponding to each of the one or more attributes of the data object. The operations performed, due to execution of the one or more programs by the one or more processors, further include generating one or more modified key values for the one or more attributes of the data object in accordance with at least a portion of the first key value; and accessing, in the tiered data structure, a data node storing the data object and a plurality of tree entries in one or more leaf nodes, the plurality of tree entries comprising a data object entry that includes the first key value and a reference to the data object and one or more attribute entries, each attribute entry including a respective attribute of the one or more attributes of the data object and the modified key value corresponding to the respective attribute.

(A14) In another aspect, a host system includes means for receiving a request to access, in a tiered data structure that is stored in the storage system, a data object and one or more attributes of the data object, the request including a first key value corresponding to the data object and one or more respective second key values corresponding to each of the one or more attributes of the data object. The host system further includes means for generating one or more modified key values for the one or more attributes of the data object in accordance with at least a portion of the first key value; and means for accessing, in the tiered data structure, a data node storing the data object and a plurality of tree entries in one or more leaf nodes, the plurality of tree entries comprising a data object entry that includes the first key value and a reference to the data object and one or more attribute entries, each attribute entry including a respective attribute of the one or more attributes of the data object and the modified key value corresponding to the respective attribute.

(A15) In some embodiments, the host system of A14 is further configured to operate in accordance with the method of any of A2 to A10.

(A16) In another aspect, a computer readable storage medium stores one or more programs configured for execution by one or more processors of a host system, the one or more programs including instructions for performing the method of any of A1 to A10.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims.

Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a storage controller 124 and a storage medium 132, and is used in conjunction with or includes a computer system 110 (e.g., a host system or a host computer). In some embodiments, storage medium 132 is a single flash memory device while in other embodiments storage medium 132 includes a plurality of flash memory devices. In some embodiments, storage medium 132 is NAND-type flash memory or NOR-type flash memory. In some embodiments, storage medium 132 includes one or more three-dimensional (3D) memory devices. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 132 is coupled to storage controller 124 through connections 103. Connections 103 are sometimes called data connections, but typically convey commands in addition to data, and optionally convey metadata, error correction information and/or other information in addition to data values to be stored in storage medium 132 and data values read from storage medium 132. In some embodiments, however, storage controller 124 and storage medium 132 are included in the same device (i.e., an integrated device) as components thereof. Furthermore, in some embodiments, storage controller 124 and storage medium 132 are embedded in a host device (e.g., computer system 110), such as a mobile device, tablet, other computer or computer controlled device, and the methods described herein are performed, at least in part, by the embedded storage controller. Storage medium 132 may include any number (i.e., one or more) of memory devices (e.g., NVM 134-1, NVM 134-2 through NVM 134-$n$) including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Memory devices (NVM 134-1, NVM 134-2, etc.) of storage medium 132 include addressable and individually selectable blocks, such as selectable portion of storage medium 136 (also referred to herein as selected portion 136). In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable and writable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for writing and reading data to and from the flash memory device.

In some embodiments, storage controller 124 includes a management module 121, a host interface 129, a storage medium interface 128, and additional module(s) 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Similarly, storage medium interface 128 provides an interface to storage medium 132 though connections 103. In some embodiments, storage medium interface 128 includes read and write circuitry, including circuitry capable of providing reading signals to storage medium 132 (e.g., reading threshold voltages for NAND-type flash memory).

In some embodiments, management module 121 includes one or more processing units 122 (also sometimes called processors, hardware processors, CPUs or the like) configured to execute instructions in one or more programs (e.g., in management module 121). In some embodiments, the one or more CPUs 122-2 are shared by one or more components within, and in some cases, beyond the function of storage controller 124. Management module 121 is coupled to host interface 129, additional module(s) 125 and storage medium interface 128 in order to coordinate the operation of these components. In some embodiments, one or more modules of management module 121 are implemented in computer system 110, as discussed in more detail below.

Additional module(s) 125 are coupled to storage medium interface 128, host interface 129, and management module 121. As an example, additional module(s) 125 may include an error control module to limit the number of uncorrectable errors inadvertently introduced into data during writes to memory or reads from memory. In some embodiments, an error control module, included in additional module(s) 125, includes an encoder and a decoder. In some embodiments, additional module(s) 125 are executed in software by the one or more CPUs 122-2 of management module 121, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, a write operation is initiated when computer system (host) 110 sends one or more host write commands (e.g., via data connections 101, or alternatively a separate control line or bus) to storage controller 124. In response, storage controller 124 sends one or more write access commands to storage medium 132, from storage medium interface 128 (e.g., via data connections 103, or alternatively a separate control line or bus), to write data to physical memory locations (addresses) within storage medium 132.

In some embodiments, the host write command includes one or more key/value pairs corresponding to data to be written. In some embodiments, before sending a host write command to the storage controller 124, the computer system (host) 110 generates one or more modified key value pairs. In some other embodiments, before sending a write access command to storage medium 132, storage controller 124 generates one or more modified key value pairs via management module 121.

In some embodiments, during a write operation, host interface 129 receives data to be stored in storage medium 132 from computer system 110. The data received by host interface 129 is made available to an encoder (e.g., in additional module(s) 125), which encodes the data.

In some embodiments, a read operation is initiated when computer system (host) 110 sends one or more host read commands (e.g., via data connections 101, or alternatively a separate control line or bus) to storage controller 124 requesting data from storage medium 132. Storage controller 124 sends one or more read access commands to storage medium 132, from storage medium interface 128 (e.g., via data connections 103, or alternatively a separate control line or bus), to obtain raw read data in accordance with physical memory locations (addresses) within storage medium 132.

In some embodiments, the host read command includes one or more key/value pairs corresponding to data to be read. In some embodiments, before sending a host read command to the storage controller 124, the computer system (host) 110 generates one or more modified key/value pairs. In some other embodiments, before sending a read access command to storage medium 132, storage controller 124 generates one or more modified key/value pairs via management module 121.

In some embodiments, storage medium interface 128 provides the raw read data to a decoder (e.g., in additional module(s) 125). If the decoding is successful, the decoded data is provided to host interface 129, where the decoded data is made available to computer system 110, or is provided to computer system 110 as a response to the host read command. In some embodiments, if the decoding is not successful, storage controller 124 may resort to a number of remedial actions or provide an indication of an irresolvable error condition.

As explained above, a storage medium (e.g., storage medium 132) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells (SLC) or multi-level cells (MLC)). In some embodiments, programming is performed on an entire page.

Figure 2A:
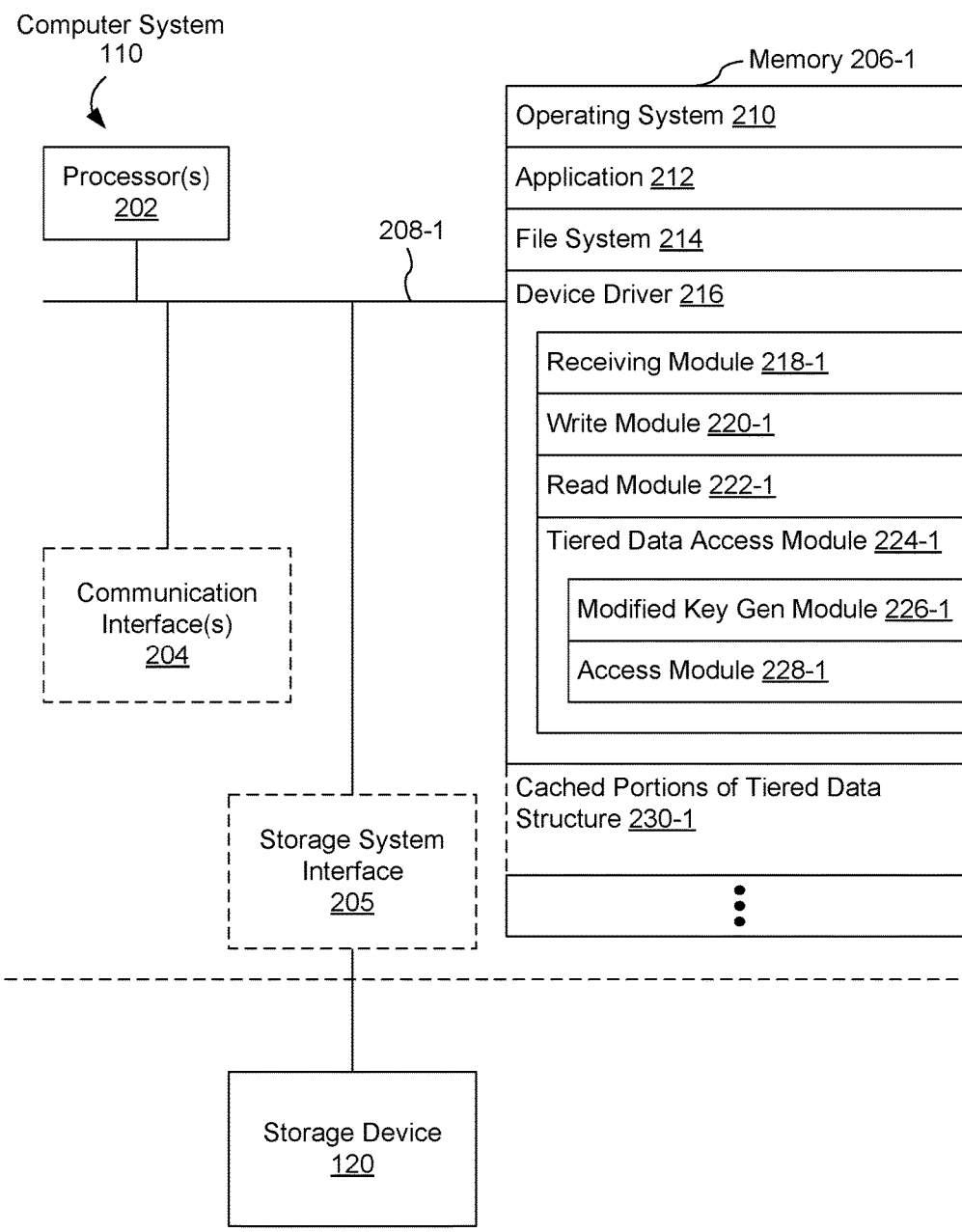
FIG. 2A is a block diagram illustrating a host computing device, in accordance with some embodiments.

FIG. 2A is a block diagram illustrating an implementation of a computer system 110, in accordance with some embodiments. Computer system 110 typically includes one or more processors 202 (also sometimes called CPUs, processing units, hardware processors, microprocessors or microcontrollers) for executing modules, programs and/or instructions stored in memory 206-1 and thereby performing processing operations, memory 206-1, and one or more communication buses 208-1 for interconnecting these components. Communication buses 208-1 optionally include circuitry (sometimes called a chipset) that interconnects and controls communications between system components. In some embodiments, such as those represented by FIG. 1, computer system 110 is coupled to storage device 120 by communication buses 208-1 and a storage system interface 205. In some embodiments, computer system 110, includes one or more communication interfaces 204 for coupling computer system 110 to other systems (not shown), e.g., via a communications network such as the internet, an intranet, or local area network, or the like.

Memory 206-1 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206-1 optionally includes one or more storage devices remotely located from processor(s) 202. Memory 206-1, or alternately the non-volatile memory device(s) within memory 206-1, comprises a non-transitory computer readable storage medium. In some embodiments, memory 206-1, or the computer readable storage medium of memory 206-1 stores the following programs, modules, and data structures, or a subset thereof:

- an operating system 210, which includes procedures for handling various basic system services and for performing hardware dependent tasks;
- an application 212;
- a file system 214;
- a device driver 216 for accessing storage device 120, including:
  - a receiving module 218-1 used for receiving host access commands;
  - a write module 220-1 used for writing data to storage device 120;

a read module 222-1 used for reading data from storage device 120;

a tiered data structure access module 224-1 used for accessing a tiered data structure (e.g., tiered data structure 300-2, FIG. 3B), including:

a modified key value generation module 226-1 used for generating modified key/value pairs;

an access module 228-1 used for accessing nodes within the tiered data structure; and cached portions 230-1 of a tiered data structure (e.g., tiered data structure 300-2, FIG. 3B) that is stored in the non-volatile storage medium of storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206-1 may store a subset of the modules and data structures identified above. Furthermore, memory 206-1 may store additional modules and data structures not described above. In some embodiments, the programs, modules, and data structures stored in memory 206-1, or the computer readable storage medium of memory 206-1, provide instructions for implementing respective operations in the methods described below with reference to FIGS. 3A-3B, 4A-4B, and 5A-5C.

Although FIG. 2A shows computer system 110 in accordance with some embodiments, FIG. 2A is intended more as a functional description of the various features which may be present in computer system 110 than as a structural schematic of the embodiments described herein. In practice, and as recognized by those of ordinary skill in the art, the programs, modules, and data structures shown separately could be combined and some programs, modules, and data structures could be separated.

Figure 2B:
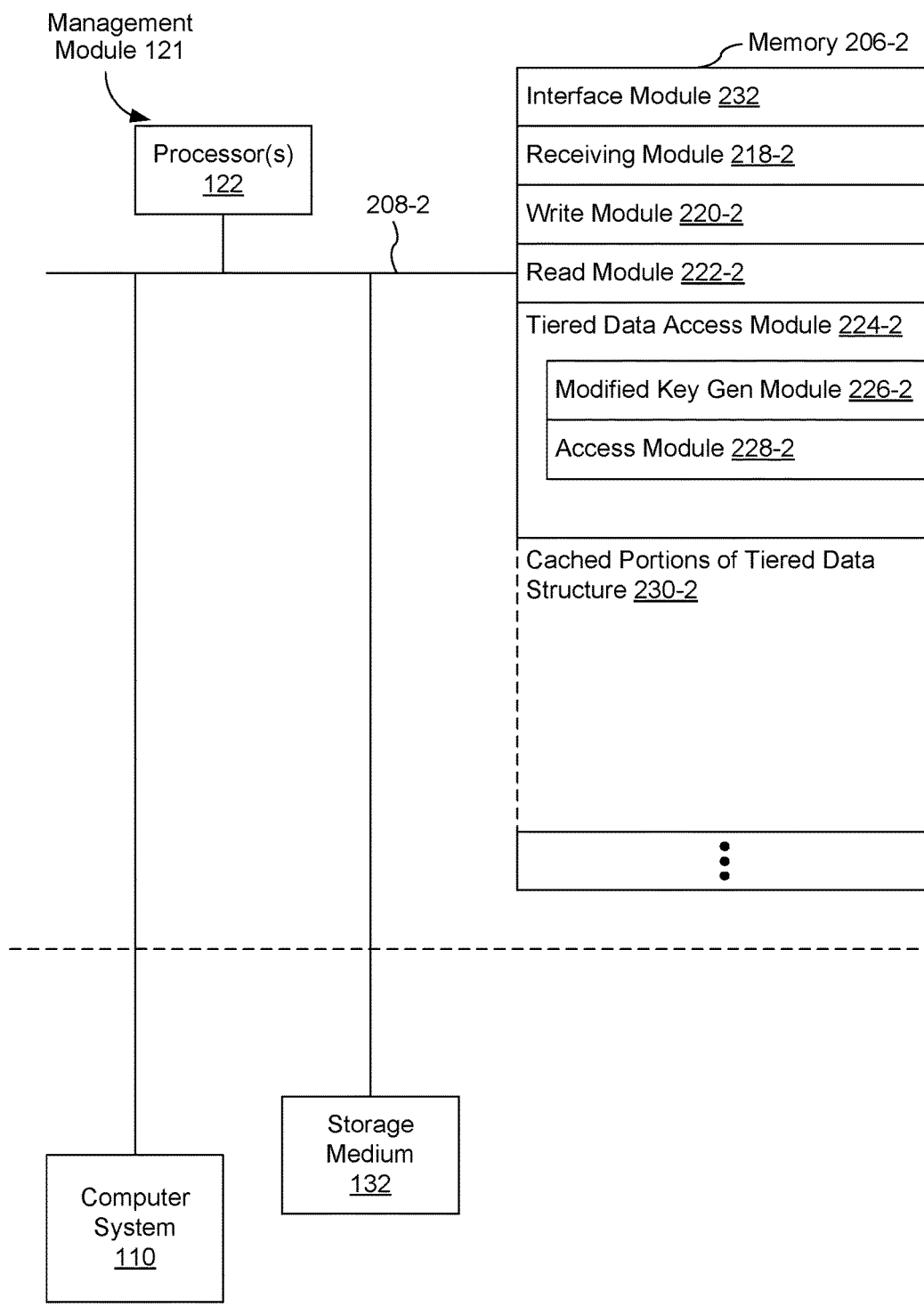
FIG. 2B is a block diagram illustrating a memory management module of a non-volatile memory controller, in accordance with some embodiments.

FIG. 2B is a block diagram illustrating an implementation of a management module 121, in accordance with some embodiments. Management module 121 typically includes one or more processors 122 (also sometimes called CPUs, processing units, hardware processors, microprocessors or microcontrollers) for executing modules, programs and/or instructions stored in memory 206-2 and thereby performing processing operations, memory 206-2, and one or more communication buses 208-2 for interconnecting these components. Communication buses 208-2 optionally include circuitry (sometimes called a chipset) that interconnects and controls communications between system components. In some embodiments, such as those represented by FIG. 1, management module 121 is coupled to computer system 110 and storage medium 132 by communication buses 208-2. Memory 206-2 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206-2 optionally includes one or more storage devices remotely located from processor(s) 122. Memory 206-2, or alternately the non-volatile memory device(s) within memory 206-2, comprises a non-transitory computer readable storage medium. In some embodiments, memory 206-2, or the computer readable storage medium of memory 206-2 stores the following programs, modules, and data structures, or a subset thereof:

an interface module 232 that is used for communicating with other components, such as memory controller 126 and non-volatile memory devices 134;

a receiving module 218-2 for receiving host access commands;

a write module 220-2 used for writing to non-volatile memory devices 134;

a read module 222-2 used for reading from non-volatile memory devices 134;

a tiered data structure access module 224-2 used for accessing a tiered data structure (e.g., tiered data structure 300-2, FIG. 3B), including:

a modified key value generation module 226-2 used for generating modified key/value pairs;

an access module 228-2 used for accessing nodes within a tiered data structure;

cached portions 230-2 of a tiered data structure (e.g., tiered data structure 300-2, FIG. 3B) that is stored in the non-volatile storage medium of a storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206-2 may store a subset of the modules and data structures identified above. Furthermore, memory 206-2 may store additional modules and data structures not described above. In some embodiments, the programs, modules, and data structures stored in memory 206-2, or the computer readable storage medium of memory 206-2, provide instructions for implementing respective operations in the methods described below with reference to FIGS. 3A-3B, 4A-4B, and 5A-5C.

Although FIG. 2B shows management module 121 in accordance with some embodiments, FIG. 2B is intended more as a functional description of the various features which may be present in management module 121 than as a structural schematic of the embodiments described herein. In practice, and as recognized by those of ordinary skill in the art, the programs, modules, and data structures shown separately could be combined and some programs, modules, and data structures could be separated.

Figure 3A:
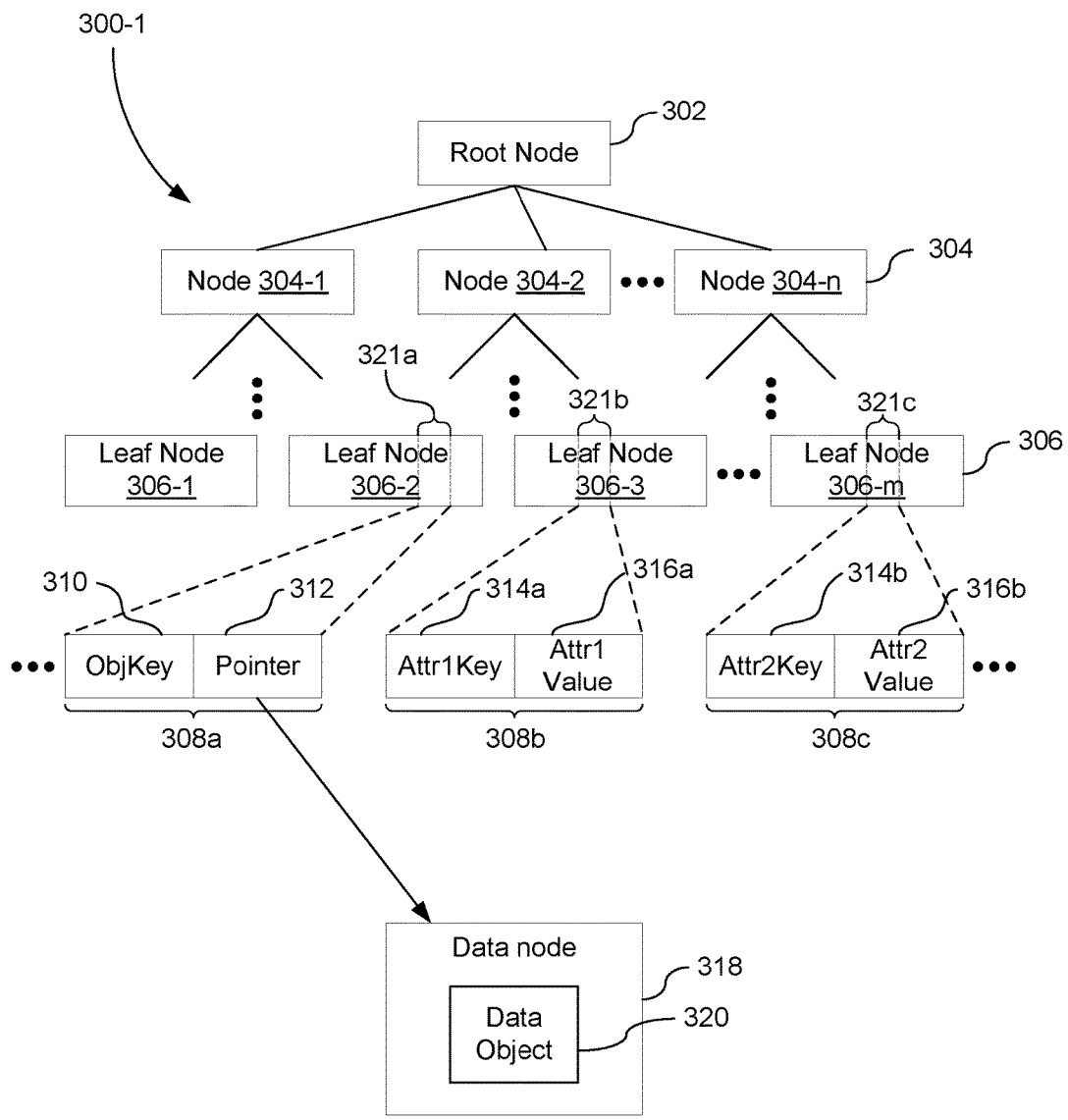
FIGS. 3A and 3B are conceptual diagrams of a tiered data structure, in accordance with some embodiments.

FIG. 3A is a simplified, conceptual diagram of a tiered data structure 300-1 (e.g., a B-tree), a type of data structure that is commonly used in databases and file systems. The root node 302 is the highest point within the tiered data structure 300-1 and serves as the parent node for all other nodes within the tiered data structure (i.e., the root node has a node depth of zero). In some embodiments, beneath the root node 302 are internal (non-leaf) nodes 304 (e.g., Nodes 304-1-304-n) and leaf nodes 306 (e.g., Leaf Nodes 306-1-306-m). Internal nodes 304 may have a variable number of child nodes. A child node with no child nodes of its own is called a leaf node. Entries in the leaf nodes 306 point to or otherwise reference specific data nodes 318, or specific data objects 320 stored within specific data nodes 318, which may be stored in non-volatile memory such as storage medium 132.

A leaf node 306 may store a variable number of keys and values. Often included amongst these keys and values are data object keys 310, data object pointers 312, attribute keys 314 (e.g., attribute key 314a-314b), and attribute values 316 (e.g., attribute value 316a-316b). Attribute values are sometimes herein called attributes, for ease of discussion. Furthermore, in some embodiments, an attribute, or attribute value, comprises both an attribute identifier (e.g., identifying a type of attribute) and a value (e.g., "color, red," where "color" is the attribute identifier, and "red" is the value). However, the present discussion is applicable without regard to the exact form or content of such attributes.

Each key/value pair in a leaf node is sometimes herein called an entry or tree entry 308 (e.g., tree entry 308a-308c). In some embodiments, keys are used to uniquely identify an entity, such as a data object or attribute, and thus the key in each tree entry 308 typically has a different value from the key in every other tree entry. Data object pointers 312 point to data objects 320 that may be stored within non-volatile memory (e.g., information in data object pointers 312 includes addresses to physical locations within the non-volatile memory). In some embodiments, attributes include source information, date information, or the like for particular data objects. A data object 320 may have any number of attributes associated with the data object.

Attribute values 316 are typically much smaller than their associated data objects. In some embodiments, when an attribute value meets (e.g., is smaller than) a predefined attribute size threshold, the attribute and its associated key are stored as a tree entry in a leaf node, and otherwise the attribute value is stored in a data node pointed to by a respective tree entry 308 in a leaf node. Similarly, in some embodiments, when a data object meets (e.g., is smaller than) a predefined object size threshold, the object and its key are stored as a tree entry in a leaf node. In FIG. 3A, object pointer 312 would be replaced with the data object itself when the data object meets the predefined object size threshold.

As noted above, an attribute key 314 and its associated attribute value 316 (e.g., attribute one key 314a and attribute one value 316a) are called sometimes called a key/value pair 308. A data object key 310 and its associated data object pointer 312 also constitute a key/value pair. Individual key/value pairs 308 are typically stored contiguously within the leaf node into which they are placed. For example, data object key 310 and data object pointer 312 are stored as tree entry 308a, which occupies a contiguous portion or block 321 (contiguous portion 321a in this example) of a respective leaf node 306 (node 306-2 in this example). Similarly, tree entry 308b is stored in contiguous portion 321b of leaf node 306-3, and tree entry 308c is stored in contiguous portion 321c of leaf node 306-m.

When a data object 320 is written to non-volatile memory such as storage medium 132 within a tiered data structure 300-1, the plurality of key/value pairs 308 associated with the data object 320 are often stored in separate leaf nodes 306. Such a situation is depicted in FIG. 3A, wherein the data object key 310 and data object pointer 312 key/value pair 308a, the attribute one key 314a and attribute one value 316a key/value pair 308b, and the attribute two key 314b and attribute two value 316b key/value pair 308c are each stored within separate leaf nodes 306. Such a situation can result in write-amplification, as discussed above.

Figure 3B:
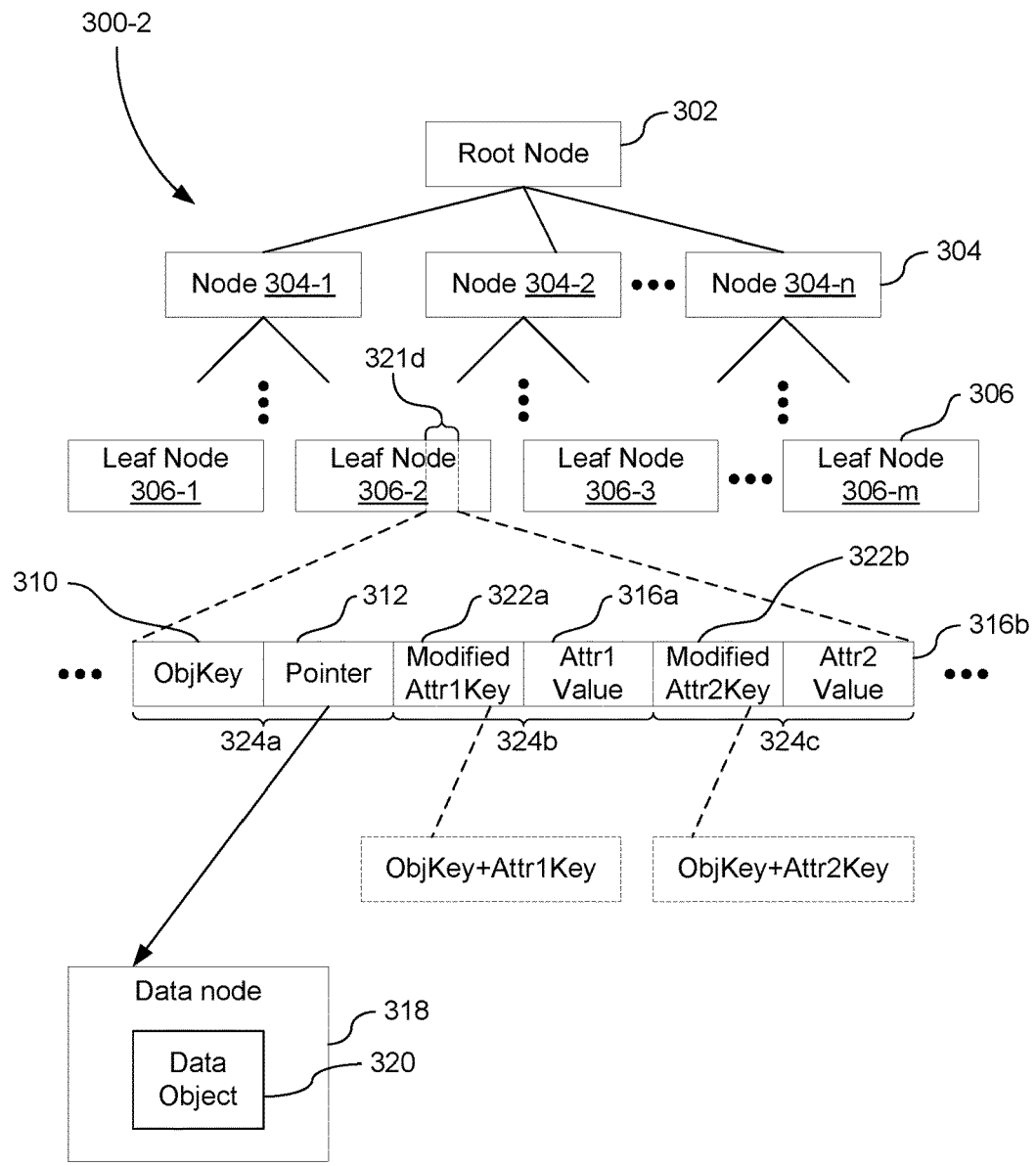

FIG. 3B is a simplified, conceptual diagram of a tiered data structure 300-2 (e.g., a B-tree), similar to the tiered data structure 300-1 depicted in FIG. 3A. Tiered data structure 300-2 is typically stored in non-volatile storage medium 132 of storage device 120. Optionally, cached portions of tiered data structure 300-2 are stored in volatile memory (e.g., a volatile memory portion of memory 206-1) of computer system 110 to facilitate efficient operation of tiered data access module 224-1. Alternatively, cached portions of tiered data structure 300-2 are stored in volatile memory (e.g., a volatile memory portion of controller memory 206-2) of management module 121 (FIG. 2B) to facilitate efficient operation of tiered data access module 224-2.

Tiered data structure 300-2 has the same node structure as tiered data structure 300-1. In this example, the key/value pairs 324a-324c (also herein called entries or tree entries) for three exemplary data components (i.e., data object pointer 312, attribute one value 316a, and attribute two value 316b) are stored contiguously within a contiguous portion 321d of a single leaf node 306-2. In this example, the attribute keys 314 shown in FIG. 3A have been modified to create modified attribute keys 322. In some embodiments, the modified attribute 322 keys are a combination of elements from the data object key 310 and the original attribute keys 314, as explained in more detail below. Further, the attribute keys are modified so that the tree entries 324b-324c for the attribute values 316 and the tree entry 324a for the associated data object 320 are adjacent to each other in the tiered data structure 300-2, or equivalently, so that there are no tree entries (i.e., key/value pairs) associated with any other data objects intervening between the tree entries 324a-324c for data object 320. When the key/value pairs are stored contiguously within the same leaf node 306, write-amplification may be significantly reduced.

In some circumstances, the entries 324 for a data object and its attributes may overlap the boundary between two leaf nodes, such as leaf nodes 306-2 and 306-3. This may happen, for example, simply because the entry 324a for the data object is at or near the tail end of a leaf node, leaving insufficient room for the corresponding attribute entries 324b, 324c to be stored in the same leaf node. In such circumstances, the entries for a data object and its associated attributes are stored in, and must be accessed from, a pair of leaf nodes of tiered data structure 300-2. Furthermore, in some unusual circumstances, in which an object has a large number of attributes, or the attributes of the object occupy a sufficient amount of room, three of more leaf nodes are required to store the entry 324a for the data object and the corresponding attribute entries.

Figure 4A:
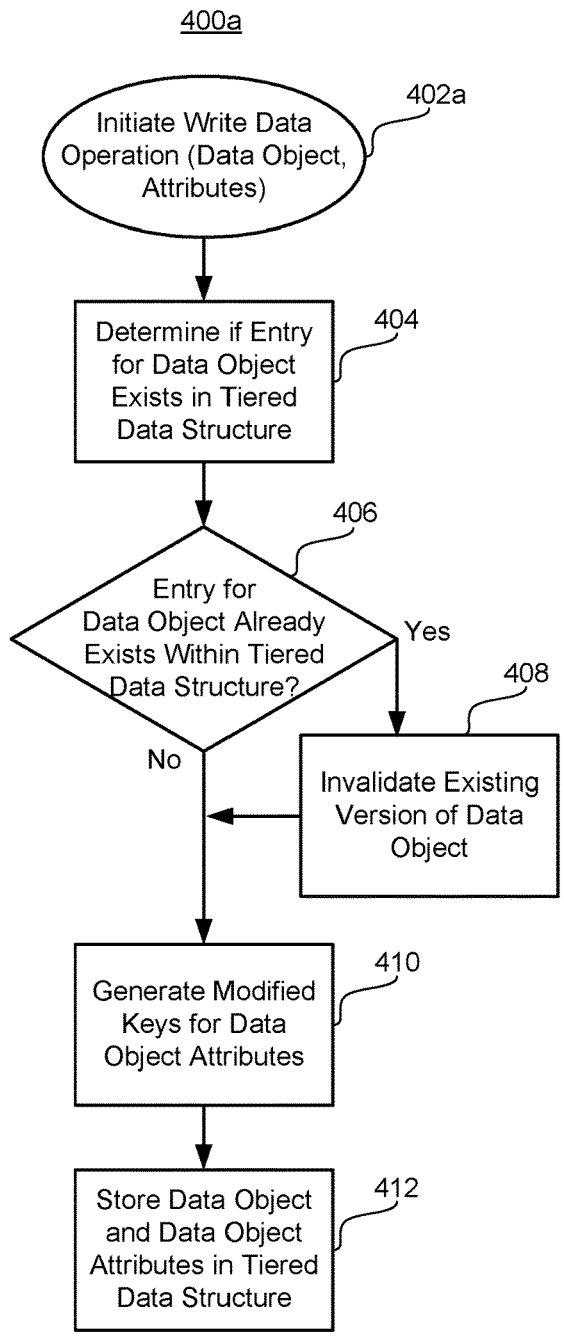
FIG. 4A is a conceptual flowchart of a reduced write-amplification write operation, in accordance with some embodiments.
Figure 4B:
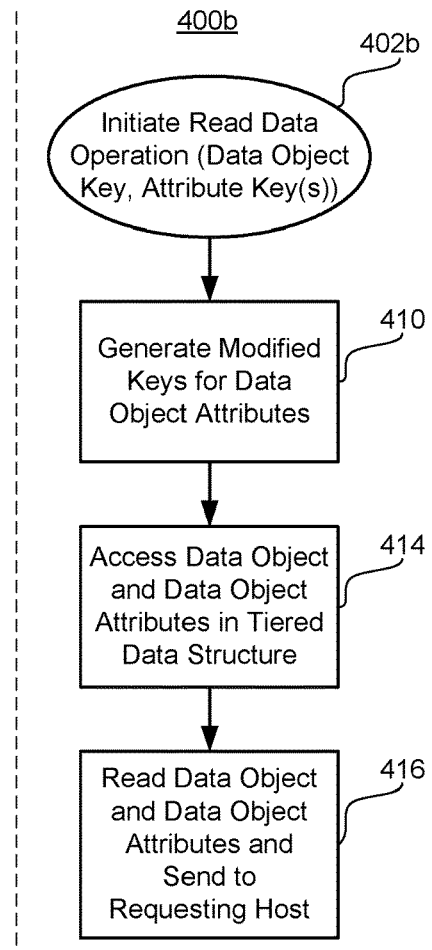
FIG. 4B is a conceptual flowchart of a read operation compatible with the reduced write-amplification write operation of FIG. 4A, in accordance with some embodiments.

FIGS. 4A-4B illustrate conceptual flow charts representations of methods of managing a data storage system, in accordance with some embodiments. More specifically, FIGS. 4A-4B represent simplified, conceptual flow charts of write and read operations to and from a non-volatile memory device, such as flash memory, employing a tiered data structure. It will be understood that numerous flash memory configurations can be used similarly.

FIG. 4A illustrates a conceptual flow chart representation of a write data operation performed within a data storage system (e.g., data storage system 100, FIG. 1) having a tiered data structure (e.g., tiered data structure 300-2, FIG. 3B), in accordance with some embodiments. With reference to the data storage system 100 depicted in FIG. 1, in some embodiments, a method 400a is performed at a computer system (e.g., computer system 110). In some embodiments, the method 400a is governed by instructions that are stored in a non-transitory computer-readable storage medium and that are executed by one or more processors of a host system, such as the one or more processing units (CPUs) 202 of computer system 110 (FIG. 2A). In some embodiments, the operations of method 400a are performed by executable software (e.g., device driver 216) that exists within a non-transitory computer-readable storage medium, such as memory 206-1 (FIG. 2A).

In some embodiments, some of the operations (or alternatively, steps) of method 400a are performed by a storage device (e.g., storage device 120), or one or more components of the storage device (e.g., storage controller 124), that is operatively coupled with the storage device and other operations of method 400a are performed at the host system. In some of these embodiments, the method 400a is governed, at least in part, by instructions that are stored in a non-transitory computer-readable storage medium and that are executed by one or more processors of a device, such as the one or more processing units (CPUs) 122 of management module 121 (FIG. 2B).

For ease of explanation, the following describes method 400a as performed by the host system (e.g., by CPUs 202 and device driver 216 of computer system 110, FIG. 2A). With reference to FIG. 2A, in some embodiments, the operations of method 400a are performed, at least in part, by a receiving module (e.g., receiving module 218-1, FIG. 2A); a write module (e.g., write module 220-1, FIG. 2A); a read module (e.g., read module 222-1); a tiered data structure access module (e.g., tiered data access module 224-1); and, within the tiered data structure access module, a modified key generation module (e.g., modified key gen module 226-1), and an access module (e.g., access module 228-1).

Method 400a begins, in some embodiments, when the host system (e.g., computer system 110, FIG. 1, or a component thereof, such as device driver 216, FIG. 2A) requests to access a data object (e.g., data object 320, FIG. 3B) within a tiered data structure (e.g., tiered data structure 300-2, FIG. 3B). In some embodiments, the host system initiates 402a a write data operation. In some embodiments, initiating 402a the write data operation includes specifying the data object. In some embodiments, initiating 402a the write data operation includes specifying the data object and the attributes associated with the data object. In some embodiments, initiating 402a the write data operation includes requesting that the data object be stored in a data storage device (e.g., storage device 120, FIG. 1). In some embodiments, initiating 402a the write data operation includes specifying a data storage device (e.g., storage device 120, FIG. 1) to which the data object is to be written.

After initiating 402a the write data operation, the host system (e.g., computer system 110, FIG. 1, or a component thereof, such as device driver 216, FIG. 2A) determines 404 if an entry (e.g., entry 324a, FIG. 3B) for the requested data object already exists within the tiered data structure 300. In some embodiments, entries for data objects are stored at multiple levels of the tiered data structure. In some embodiments, an entry for the data object is stored in a non-volatile storage medium (e.g., storage medium 132, FIG. 1). In some embodiments, determining 404 if an entry for the data object already exists (i.e., is already stored) within the tiered data structure includes reading tree entries within multiple levels of the tiered data structure in order to determine if there is a node in the tiered data structure that contains an entry for the data object.

In some embodiments, if an entry for the data object already exists within the tiered data structure (i.e. 406—"yes"), the existing version of the requested data object (e.g., data object 320, FIG. 3B) is invalidated 408. This is typically done because the existing version of the requested data object will be replaced with a new version. However, in some embodiments, the existing version of the requested data object is invalidated after the new version of the data object is stored in the tiered data structure (e.g., after operation 412).

In some embodiments, invalidating 408 the existing version of the data object includes deleting the existing version of the data object, or alternatively marking the existing version of the data object as invalid, which eventually results in the existing version of the data object being erased from a data node (e.g., data node 318, FIG. 3B) from a non-volatile storage medium (e.g., storage medium 132, FIG. 1). In some embodiments, invalidating 408 the existing version of the data object includes deleting the tree entries (e.g., tree entries 324a-324c, FIG. 3B) associated with the existing version of the data object, or alternatively marking those tree entries as invalid. In yet some other embodiments in which old values of an object and/or its attributes are part of a snapshot, the old values are not deleted until the corresponding snapshot is deleted. In such embodiments, the old values of objects and object attributes are differentiated from newer values of the objects and object attributes by associating version numbers with the corresponding leaf node entries. Typically, access to the old versions of objects and attributes is prevented during normal data processing operations. Furthermore, typically, access to the old versions of objects and attributes is enabled only when performing predefined operations associated with corresponding snapshots.

In some embodiments, method 400a continues by generating 410 modified keys for the attributes (e.g., attributes values) associated with the requested data object (e.g., data object 320, FIG. 3B). In some embodiments, generating 410 modified keys for the attributes associated with the requested data object includes combining elements of the data object key (e.g., data object key 310, FIG. 3A or 3B) associated with the requested data object and the original attribute keys (e.g., attribute keys 314, FIG. 3A). In some embodiments, generating 410 modified keys for the attributes associated with the requested data object includes prepending the data object key to the keys of the attributes associated with the requested data object. In some other embodiments, generating 410 modified keys for the attributes associated with the requested data object includes prepending a portion of the data object key to the attribute keys of the attributes associated with the requested data object.

After generating 410 modified keys for the attributes associated with the requested data object, the requested data object and the attributes associated with the requested data object are stored 412 in the tiered data structure. In some embodiments, prior to storing the data object, the data object is encoded with an error correction information (sometimes called an error control code or error correction code), such as Hamming, Reed-Solomon (RS), Bose Chaudhuri Hocquenghem (BCH), or low-density parity-check (LDPC) to produce encoded data (e.g., one or more codewords), which is then stored 412 in the tiered data structure.

In some embodiments, the requested data object is stored in a non-volatile storage medium (e.g., storage medium 132, FIG. 1). In some embodiments, the requested data object is stored within a leaf node (e.g., leaf node 306-2, FIG. 3B). In some embodiments, the attributes associated with the requested data object are stored in a non-volatile storage medium (e.g., storage medium 132, FIG. 1). In some embodiments, storing 412 the requested data object and the attributes associated with the requested data object includes encoding the requested data object, for example by adding error correction information to the requested data object.

Additional details concerning each of the processing steps for method 400a, as well as details concerning additional processing steps, are presented below with reference to FIGS. 5A-5C.

FIG. 4B illustrates a conceptual flow chart representation of a read data operation performed within a data storage system (e.g., data storage system 100, FIG. 1) having a tiered data structure (e.g., tiered data structure 300-2, FIG.

3B), in accordance with some embodiments. With reference to the data storage system 100 depicted in FIG. 1, in some embodiments, a method 400b is performed at a computer system (e.g., computer system 110). In some embodiments, the method 400b is governed by instructions that are stored in a non-transitory computer-readable storage medium and that are executed by one or more processors of a host system, such as the one or more processing units (CPUs) 202 of computer system 110 (FIG. 2A). In some embodiments, the operations of method 400b are performed by executable software (e.g., device driver 216) that exists within a non-transitory computer-readable storage medium, such as memory 206-1 (FIG. 2A).

In some embodiments, some of the operations (or alternatively, steps) of method 400b are performed by a storage device (e.g., storage device 120), or one or more components of the storage device (e.g., storage controller 124), that is operatively coupled with the storage device and other operations of method 400b are performed at the host system. In some of these embodiments, the method 400b is governed, at least in part, by instructions that are stored in a non-transitory computer-readable storage medium and that are executed by one or more processors of a device, such as the one or more processing units (CPUs) 122 of management module 121 (FIG. 2B).

For ease of explanation, the following describes method 400b as performed by the host system (e.g., by CPUs 202 and device driver 216 of computer system 110, FIG. 2A). With reference to FIG. 2A, in some embodiments, the operations of method 400b are performed, at least in part, by a receiving module (e.g., receiving module 218-1, FIG. 2A); a write module (e.g., write module 220-1, FIG. 2A); a read module (e.g., read module 222-1); a tiered data structure access module (e.g., tiered data access module 224-1); and, within the tiered data structure access module, a modified key generation module (e.g., modified key gen module 226-1), and an access module (e.g., access module 228-1).

The method 400b begins, in some embodiments, when the host system (e.g., computer system 110, FIG. 1, or a component thereof, such as device driver 216, FIG. 2A) requests to access a data object (e.g., data object 320, FIG. 3B) within a tiered data structure (e.g., tiered data structure 300-2, FIG. 3B). In some embodiments, the host system initiates 402b a read data operation. In some embodiments, initiating 402b the read data operation includes selecting or specifying the data object. In some embodiments, initiating 402b the read data operation includes selecting or specifying the data object and the attributes associated with the data object. In some embodiments, initiating 402b the read data operation includes requesting that the data object be read from a data storage device (e.g., storage device 120, FIG. 1). In some embodiments, initiating 402a the read data operation includes specifying a data storage device (e.g., storage device 120, FIG. 1) from which the data object is to be read.

After initiating 402b the read data operation, modified keys for the attributes (e.g., attributes 316, FIG. 3B) associated with the requested data object (e.g., data object 320, FIG. 3B) are generated 410. Generating modified keys is discussed above with reference to operation 410 of method 400a, FIG. 4A.

The method 400b continues, after generating the modified key, with accessing 414 the requested data object and the attributes associated with the requested data object within the tiered data structure. In some embodiments, the requested data object is accessed from a data node (e.g., data node 318, FIG. 3B), and the data object attributes are accessed from one or more leaf nodes (e.g., leaf nodes 306, FIG. 3B). Furthermore, as described above with reference to FIG. 3B, accessing the requested data object includes accessing a data object entry (e.g., entry 324a, FIG. 3B) and associated attribute entries (e.g., entries 324b and 324c, FIG. 3B) from either a single leaf node of the tiered data structure or a pair of leaf nodes of the tiered data structure, and using a pointer in the access data object entry to access the data object.

In some embodiments, or in some circumstances (e.g., when the requested data object is smaller than a predefined threshold size), the requested data object and the attributes associated with the requested data object are accessed 414 from a leaf node (e.g., leaf node 306-2, FIG. 3B). In some embodiments, the requested data object and the attributes associated with the requested data object are accessed 414 from one or more data nodes that are stored within a non-volatile storage medium (e.g., storage medium 132, FIG. 1).

After accessing 414 the requested data object from within the tiered data structure, the method 400b continues, in some embodiments, when the host system (e.g., computer system 110, or a component thereof, such as device driver 216, FIG. 2A) reads 416 the requested data object and the attributes associated with the requested data object and sends the read data to the requesting host. In some embodiments, reading 416 the requested data object and the attributes associated with the requested data object includes decoding the accessed data stored within the tiered data structure. For example, as described above, the data object may have been encoded with error correction information prior to it being stored in a data node in the tiered data structure, and when that data object is read from the tiered data structure, the obtained data object is decoded to produce decoded data suitable for being sent to the requesting host. The decoding process also corrects any errors in the requested data object, so long as the number of such errors are within the error correction power of the error control code that was used to encode the requested data object.

Additional details concerning each of the processing steps for method 400a, as well as details concerning additional processing steps, are presented below with reference to FIGS. 5A-5C.

Figure 5B:
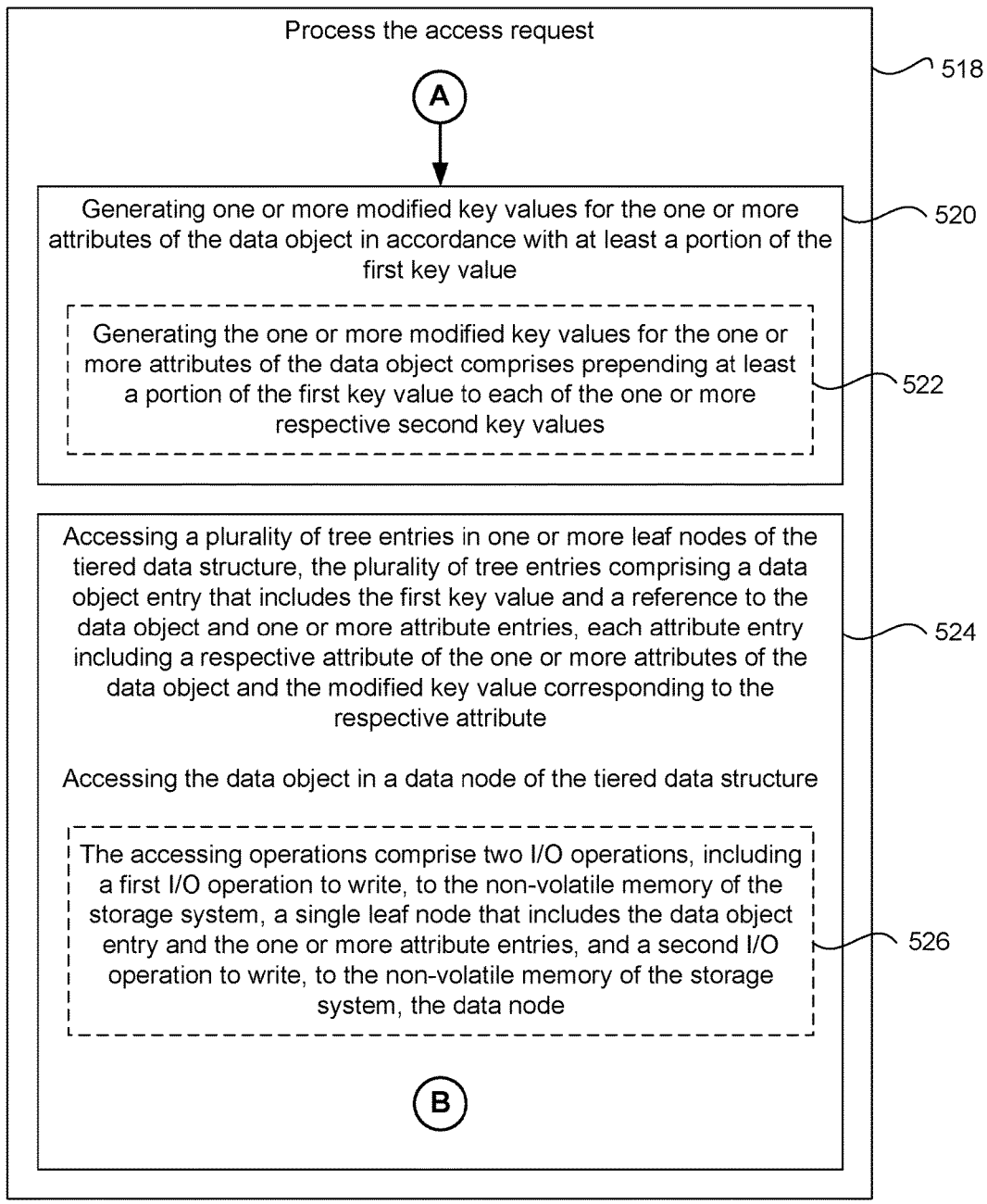
Figure 5C:
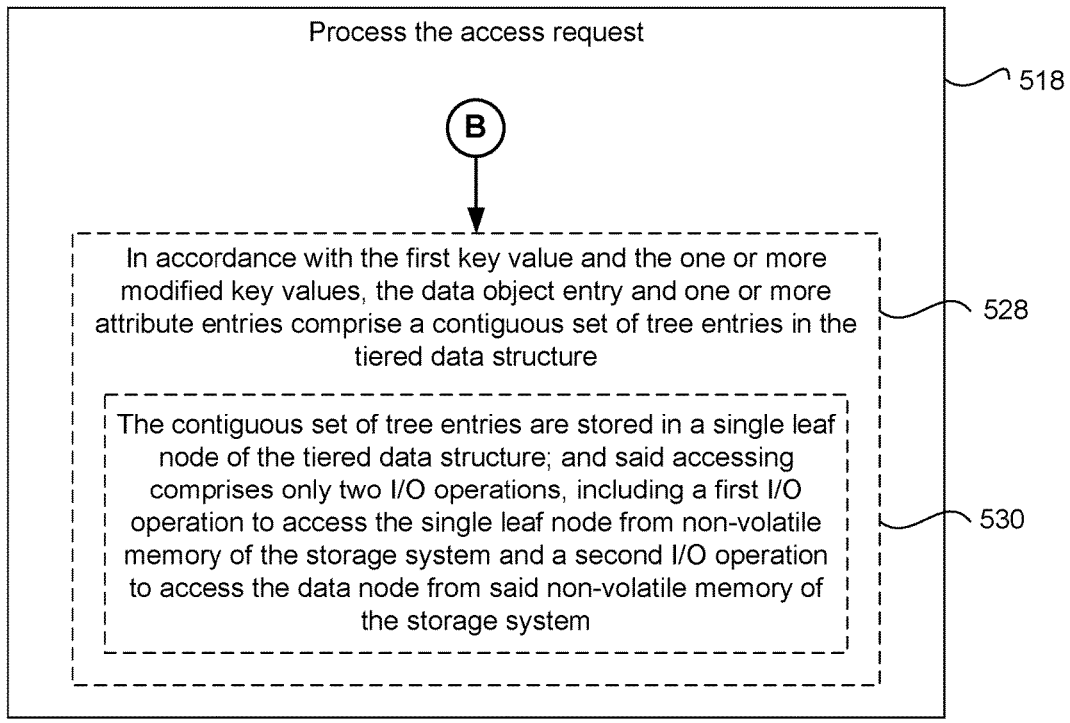

FIGS. 5A-5C illustrate a flowchart representation of a method of managing a data storage system employing a tiered data structure, in accordance with some embodiments. With reference to the data storage system 100 depicted in FIG. 1, in some embodiments, a method 500 is performed at a computer system (e.g., computer system 110). In some embodiments, the method 500 is governed by instructions that are stored in a non-transitory computer-readable storage medium and that are executed by one or more processors of a host system, such as the one or more processing units (CPUs) 202 of computer system 110 (FIG. 2A). In some embodiments, the operations of method 500 are performed by executing software (e.g., device driver 216) stored in a non-transitory computer-readable storage medium, such as memory 206-1 (FIG. 2A).

In some embodiments, some of the operations (or alternatively, steps) of method 500 are performed by a storage device (e.g., storage device 120), or one or more components of the storage device (e.g., storage controller 124), that is operatively coupled with the storage device and other operations of method 500 are performed at the host system. In some of these embodiments, the method 500 is governed, at least in part, by instructions stored in a non-transitory computer-readable storage medium and that are executed by one or more processors of a device, such as the one or more processing units (CPUs) 122 of management module 121 (FIG. 2B).

For ease of explanation, the following describes method 500 as performed by the host system (e.g., by CPUs 202 and device driver 216 of computer system 110, FIG. 2A). With reference to FIG. 2A, in some embodiments, the operations of method 500 are performed, at least in part, by a receiving module (e.g., receiving module 218-1, FIG. 2A); a write module (e.g., write module 220-1, FIG. 2A); a read module (e.g., read module 222-1); a tiered data structure access module (e.g., tiered data access module 224-1); and, within the tiered data structure access module, a modified key generation module (e.g., modified key gen module 226-1), and an access module (e.g., access module 228-1).

With reference to FIGS. 5A-5C, the host system (e.g., computer system 110, or a component thereof, such as device driver 216, FIG. 2A) manages 502 a storage system (e.g., data storage system 100, FIG. 1) having one or more storage devices (e.g., NVM devices 134 in storage device 120, FIG. 1). In some embodiments, the managing is performed 504 by a host system (e.g., computer system 110, FIG. 10) that is separate from the storage system, and cached copies of at least the non-leaf nodes (e.g., nodes 304, FIG. 3B) are stored in volatile memory of the host system. The caching (i.e., storing cached portions in volatile memory) of portions of the tiered data structure can help reduce the number of I/O operations required to perform data access operations, for example by avoiding additional I/O operations to access non-leaf nodes.

Method 500 includes receiving a request to access 506, in a tiered data structure (e.g., tiered data structure 300-2, FIG. 3B), a data object (e.g., data object 320, FIG. 3B), wherein the tiered data structure is stored in the storage system. The request includes a first key value (e.g., data object key 310, FIG. 3B) corresponding to the data object and one or more respective second key values (e.g., attribute keys 314*a*, 314*b*, FIG. 3A) corresponding to each of the one or more attributes of the data object. In some circumstances, the request to access the data object and its attributes originates from an application 212, or file system 214 (FIG. 2A), executed by a requesting host system (e.g., computer system 110).

In some embodiments, the request to access the data object and its attributes includes 508 a read command to read, from the tiered data structure (e.g., tiered data structure 300-2, FIG. 3B) the data object and the one or more attributes of the data object. In some embodiments, the data object (e.g., data object 320, FIG. 3B), as stored in the storage system (e.g., data storage system 100, FIG. 1), comprises 510 encoded data, as explained above with reference to FIG. 4A (412). In some embodiments, managing the storage system includes decoding 512 the data object, read from the tiered data structure, and providing the decoded data to a requester, as explained above with reference to FIG. 4B (416).

In some embodiments, the request to access the data object and its attributes includes 514 a write command to write, to the tiered data structure (e.g., tiered data structure 300, FIG. 3), the data object and the one or more attributes of the data object.

In some embodiments, the tiered data structure (e.g., tiered data structure 300-2, FIG. 3B) includes 516 a tree of nodes, including non-leaf nodes (e.g., nodes 304, FIG. 3B), leaf nodes (e.g., leaf nodes 306, FIG. 3B), and data nodes (e.g., data node 318, FIG. 3B), wherein at least the leaf nodes and data nodes are stored in non-volatile memory of the storage system (e.g., data storage system 100, FIG. 1).

The method 500 of managing a storage system (e.g., data storage system 100, FIG. 1) further includes processing 518 the access request. In some embodiments, processing 518 the access request includes generating 520 one or more modified key values (e.g., modified attribute keys 322, FIG. 3B) for the one or more attributes of the data object in accordance with at least a portion of the first key value. In some embodiments generating the one or more modified key values for the one or more attributes of the data object includes, or is accomplished by, prepending 522 at least a portion of the first key value to each of the one or more respective second key values.

In some embodiments, processing 518 the access request further includes accessing 524 a plurality of tree entries (e.g., tree entries 324, FIG. 3B) in one or more leaf nodes (e.g., leaf nodes 306, FIG. 3B) of the tiered data structure (e.g., tiered data structure 300-2, FIG. 3B), the plurality of tree entries including a data object entry (e.g., tree entry 324*a*, FIG. 3B) that includes the first key value (e.g., data object key 310, FIG. 3B) and a reference to the data object (e.g., data object pointer 312, FIG. 3) and one or more attribute entries (e.g., attribute entries 324*b*-324*c*, FIG. 3B), each attribute entry including a respective attribute (e.g., attribute values 316, FIG. 3B) of the one or more attributes of the data object and the modified key value (e.g., modified attribute keys 322*a*-322*b*, FIG. 3B) corresponding to the respective attribute.

In some embodiments, processing the access request further includes accessing the data object in a data node (e.g., data node 318, FIG. 3B) of the tiered data structure (e.g., tiered data structure 300-2, FIG. 3B). In some embodiments, the accessing operations comprise 526 two I/O (input/output) operations, including a first I/O operation to write, to the non-volatile memory (e.g., NVM 134, FIG. 1) of the storage system, a single leaf node (e.g., leaf node 306-2, FIG. 3B) that includes the data object entry (e.g., tree entry 324*a*, FIG. 3B) and the one or more attribute entries (e.g., tree entries 324*b*-324*c*, FIG. 3B), and a second I/O operation to write, to the non-volatile memory of the storage system, the data node (e.g., data node 318, FIG. 3B).

In some embodiments, in accordance with the first key value (e.g., data object key 310, FIG. 3B) and the one or more modified key values (e.g., modified attribute keys 322, FIG. 3B), the data object entry (e.g., data object entry 324*a*, FIG. 3B) and one or more attribute entries (e.g., attribute entries 324*b*-324*c*, FIG. 3B) comprise 528 a contiguous set of tree entries (e.g., contiguous portion 321*d*, FIG. 3B) in the tiered data structure. In some embodiments, or in some circumstances (e.g., where the data object entry and attribute entries are all located in the same tree node), the contiguous set of tree entries are stored 530 in a single leaf node of the tiered data structure; and accessing the plurality of tree entries and the data object includes (e.g., is accomplished using) just two I/O operations, including a first I/O operation to access the single leaf node from non-volatile memory of the storage system (i.e., to access the data object entry and attribute entries) and a second I/O operation to access the data node from said non-volatile memory of the storage system. It is noted that after the first I/O operation, location information is extracted from the data object entry, and that information is used to determine the data node to be accessed in the second I/O operation.

As noted above, in some circumstances the data object entry and attribute entries are stored in two leaf nodes, in which case the accessing the data object and the plurality of attribute entries includes three I/O operations: two I/O operations to access the tree entries and a third I/O operation to access the data object. As also noted above, in some very unusual circumstances, the data object entry and attribute entries are stored in more than two leaf nodes. In that case, accessing the data object and the plurality of attribute entries includes N+1 I/O operations, where N is the number of leaf nodes in which the data object entry and attribute entries are stored.

In some embodiments, the portion of the one or more non-volatile memory devices is an erase block. In some embodiments, the one or more non-volatile memory devices are flash memory devices.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of managing a storage system having one or more storage devices, the method comprising:
   receiving a request to access, in a tiered data structure stored at least in part in the one or more storage devices of the storage system, a data object and one or more attributes of the data object, wherein the tiered data structure is stored in the storage system, the request including a first key value corresponding to the data object and one or more second key values corresponding to the one or more attributes of the data object; and
   processing the access request, including:
      generating one or more modified key values for the one or more attributes of the data object in accordance with at least a portion of the first key value, each modified key value differing from but corresponding to a respective second key value of the one or more second key values in the received request;
      accessing a plurality of tree entries in one or more leaf nodes of the tiered data structure, the plurality of tree entries comprising a data object entry that includes the first key value and a reference to the data object and further comprising one or more attribute entries corresponding to the data object, each attribute entry including a respective attribute of the one or more attributes of the data object and the modified key value corresponding to the respective attribute; and
      accessing the data object in a data node of the tiered data structure;
      including, after generating the one or more modified key values, accessing, in the one or more storage devices of the storage system, a respective attribute of the data object, requested by the received request, in an attribute entry having the modified key value corresponding to the respective attribute.

2. The method of claim 1, wherein generating the one or more modified key values for the one or more attributes of the data object comprises prepending at least a portion of the first key value to each of the one or more second key values.

3. The method of claim 1, wherein, in accordance with the first key value and the one or more modified key values, the data object entry and one or more attribute entries comprise a contiguous set of tree entries in a single leaf node of the tiered data structure.

4. The method of claim 3, wherein:
   said accessing comprises only two I/O operations, including a first I/O operation to access the single leaf node from non-volatile memory of the storage system and a second I/O operation to access the data node from said non-volatile memory of the storage system.

5. The method of claim 1, wherein the request to access comprises a read command to read, from the tiered data structure, the data object and the one or more attributes of the data object.

6. The method of claim 5, wherein:
   the data object, as stored in the storage system, comprises encoded data; and
   the method includes decoding the data object, reading from the tiered data structure, and providing the decoded data object to a requester.

7. The method of claim 1, wherein the request to access comprises a write command to write, to the tiered data structure, the data object and the one or more attributes of the data object.

8. The method of claim 7, wherein said accessing operations comprises two I/O operations, including a first I/O operation to write, to a non-volatile memory of the storage system, a single leaf node that includes the data object entry and the one or more attribute entries, and a second I/O operation to write, to the non-volatile memory of the storage system, the data node.

9. The method of claim 1, wherein the tiered data structure comprises a tree of nodes, including non-leaf nodes, leaf nodes, and data nodes, wherein at least the leaf nodes and data nodes are stored in non-volatile flash memory of the storage system.

10. The method of claim 9, wherein at least the generating of the one or more modified key values is performed by a host system separate from the storage system, and at least the non-leaf nodes are stored in volatile memory of the host system.

11. A host system, the system comprising:
an interface for operatively coupling to a storage system having one or more storage devices;
one or more hardware processors; and
memory storing one or more programs, which when executed by the one or more processors, cause the host system to perform operations comprising:
receiving a request to access, in a tiered data structure that is stored in the storage system, a data object and one or more attributes of the data object, the request including a first key value corresponding to the data object and one or more second key values corresponding to the one or more attributes of the data object;
generating one or more modified key values for the one or more attributes of the data object in accordance with at least a portion of the first key value, each modified key value differing from but corresponding to a respective second key value of the one or more second key values in the received request; and
accessing, in the tiered data structure, a data node storing the data object and a plurality of tree entries in one or more leaf nodes, the plurality of tree entries comprising a data object entry that includes the first key value and a reference to the data object, and further comprising one or more attribute entries corresponding to the data object, each attribute entry including a respective attribute of the one or more attributes of the data object and the modified key value corresponding to the respective attribute;
including, after generating the one or more modified key values, accessing, in the one or more storage devices of the storage system, a respective attribute of the data object, requested by the received request, in an attribute entry having the modified key value corresponding to the respective attribute.

12. The host system of claim 11, wherein the one or more programs includes a tiered data access module that generates the one or more modified key values for the one or more attributed of the data object.

13. The host system of claim 12, wherein the tiered data access module includes instructions for accessing, in the tiered data structure, the data node storing the data object.

14. The host system of claim 11, wherein generating the one or more modified key values for the one or more attributes of the data object comprises prepending at least a portion of the first key value to each of the one or more second key values.

15. The host system of claim 11, wherein, in accordance with the first key value and the one or more modified key values, the data object entry and one or more attribute entries comprise a contiguous set of tree entries in a single leaf node of the tiered data structure.

16. A storage system, the system comprising:
an interface for operatively coupling to a host system;
one or more processors; and
controller memory storing one or more programs, which when executed by the one or more processors, cause the storage system to perform operations comprising:
receiving a request from the host system to access, in a tiered data structure that is stored in the storage system, a data object and one or more attributes of the data object, the request including a first key value corresponding to the data object and one or more respective second key values corresponding to each of the one or more attributes of the data object;
generating one or more modified key values for the one or more attributes of the data object in accordance with at least a portion of the first key value, each modified key value differing from but corresponding to a respective second key value of the one or more second key values in the received request; and
accessing, in the tiered data structure, a data node storing the data object and a plurality of tree entries in one or more leaf nodes, the plurality of tree entries comprising a data object entry that includes the first key value and a reference to the data object, and further comprising one or more attribute entries, each attribute entry including a respective attribute of the one or more attributes of the data object and the modified key value corresponding to the respective attribute;
including, after generating the one or more modified key values, accessing, in the tiered data structure, a respective attribute of the data object, requested by the received request, in an attribute entry having the modified key value corresponding to the respective attribute.

17. The storage system of claim 16, wherein the one or more programs includes a tiered data access module that generates the one or more modified key values for the one or more attributes of the data object.

18. The storage system of claim 17, wherein the tiered data access module includes instructions for accessing, in the tiered data structure, the data node storing the data object.

19. The storage system of claim 16, wherein generating the one or more modified key values for the one or more attributes of the data object comprises prepending at least a portion of the first key value to each of the one or more second key values.

20. The storage system of claim 16, wherein, in accordance with the first key value and the one or more modified key values, the data object entry and one or more attribute entries comprise a contiguous set of tree entries in a single leaf node in the tiered data structure.

* * * * *